UNITED STATES PATENT OFFICE.

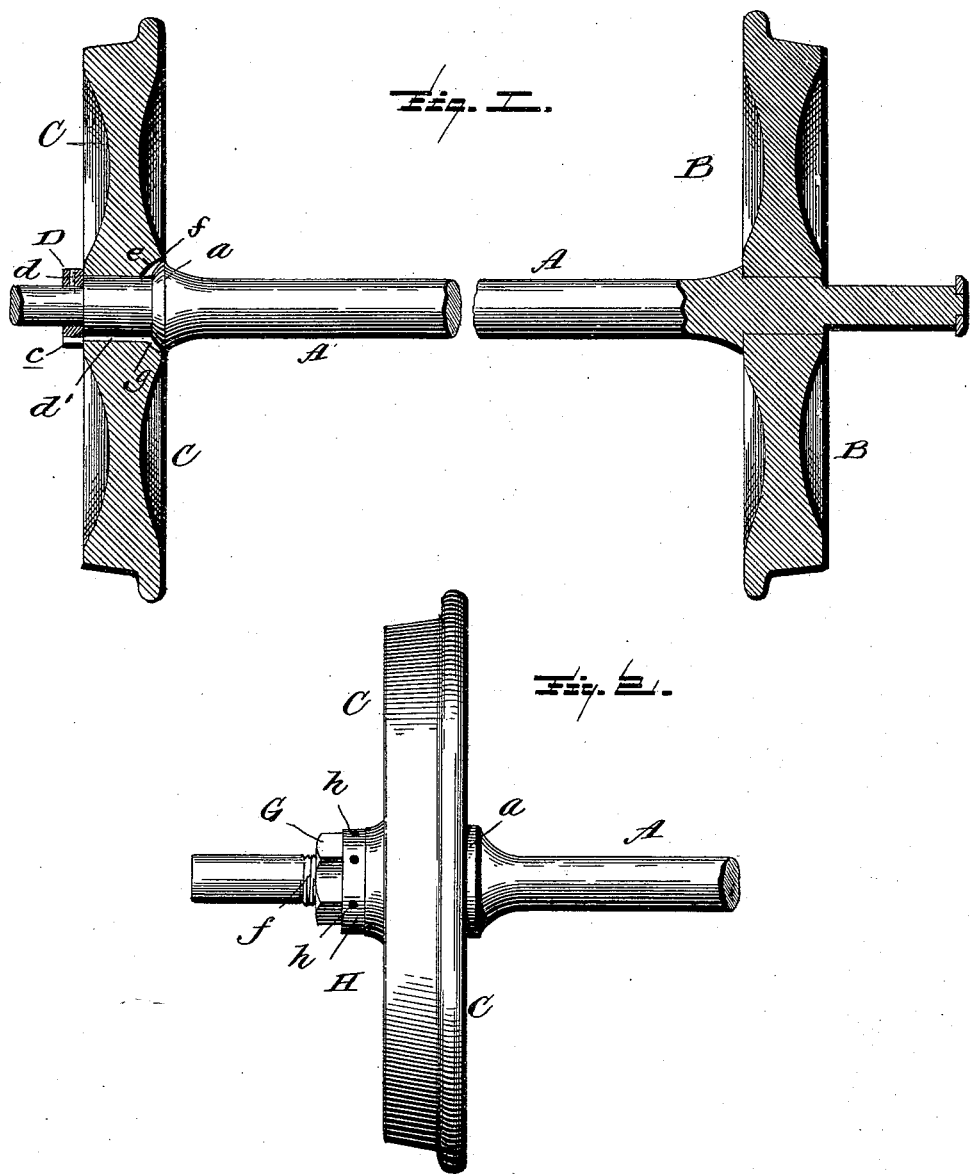

ABNER JOHNSTON AND WILLIAM A. JOHNSTON, OF JERSEY CITY, NEW JERSEY, ASSIGNORS OF ONE-HALF TO RICHARD PARKER, OF NEW YORK, N. Y.

CAR WHEEL AND AXLE.

SPECIFICATION forming part of Letters Patent No. 478,512, dated July 5, 1892.

Application filed October 6, 1891. Serial No. 407,924. (No model.)

*To all whom it may concern:*

Be it known that we, ABNER JOHNSTON and WILLIAM A. JOHNSTON, citizens of the United States, residing at Jersey City, in the county of Hudson and State of New Jersey, have invented certain new and useful Improvements in Car Wheels and Axles; and we do hereby declare that the following is a full, clear, and exact description of the same, reference being had to the annexed drawings, making a part of this specification, and to the letters of reference marked thereon.

This invention relates to certain new and useful improvements in car wheels and axles; and it has for its objects, among others, to provide for the easy turning of curves and to avoid skidding and wear on the tracks and wheels. We make one wheel fast upon the axle and the other loose. We have a novel way of lubricating the bearings. We provide for taking up lost motion.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, in which—

Figure 1 is a sectional view of our improvement. Fig. 2 is an edge view of a wheel upon its axle, showing the nut for taking up lost motion.

Like letters of reference indicate like parts in both views where they occur.

Referring now to the details of the drawings by letter, A designates the axle, upon which is fast in any suitable manner, as by shrinking, the wheel B. The other end of the axle is formed with a shoulder $a$, which prevents inward movement of the wheel C, the said wheel being loosely sleeved upon the axle and confined between the said shoulder and the collar D, which is held fast to the axle in any suitable manner, as by screw or pin $d$. This wheel C is provided with a groove $d'$, extending through the same in proximity to the axle, as seen in Fig. 1, and the collar is similarly provided with a slot or groove $c$, as seen in Fig. 1, so that the oil from the oil-box (not shown) will be carried through the said slots or grooves to the bearing in a manner which will be readily understood.

In order to take up lost motion and to compensate for wear, we provide the axle near the end with a screw-threaded portion $f$, as seen in Fig. 2, which is engaged by the nut G, which has a bearing against the nut H, the latter bearing against the hub of the wheel and may be provided with holes $h$ for the reception of a suitable tool, by which it may be turned up when necessary. It will be seen that the shoulder $a$ is convex upon its exterior, as shown in Fig. 1, and the wheel around the hub is formed with a circumferential concavity, as shown at $e$, the concavity and convexity above described being of such a degree with relation to each other that they only touch at the point $f'$, thus leaving a chamber $g$ for the lodgment of the oil or other lubricant and also strengthening the axle at the point of connection with the wheel and rendering it less liable to break.

The operation will be apparent from the foregoing description, when taken in connection with the annexed drawings. The oil passes from the oil-box through the openings in the collar and wheel to the bearing, which is thus kept constantly and automatically lubricated.

What we claim as new is—

1. The combination, with an axle, of a wheel thereon provided with a passage-way therethrough and a collar having a coincident passage-way, said passage-ways being for the lubricant, as and for the purpose specified.

2. The combination, with an axle, of a wheel loose upon the axle and provided near its bore with a groove extending through the wheel and a collar outside the wheel and provided with a similar groove, substantially as and for the purpose specified.

3. The combination, with the axle having a convex shoulder, of a wheel having oil-passages and a circumferential concavity to form a chamber, substantially as and for the purpose specified.

In testimony that we claim the above we have hereunto subscribed our names in the presence of two witnesses.

ABNER JOHNSTON.
WILLIAM A. JOHNSTON.

Witnesses:
MARTIN LOGAN,
HENRY MCENRY.